United States Patent

[15] 3,696,279

Gyori

[45] Oct. 3, 1972

[54] ELECTRICAL CONTROL APPARATUS

[72] Inventor: Louis Gyori, Chomedey, Quebec, Canada

[73] Assignee: Marathon Golf Cars Ltd., Montreal, Quebec, Canada

[22] Filed: July 16, 1970

[21] Appl. No.: 55,410

[52] U.S. Cl. ................................................. 318/139
[51] Int. Cl. ............................................... H02p 7/20
[58] Field of Search ........................... 318/139, 17

[56] References Cited

UNITED STATES PATENTS

| 3,264,540 | 8/1966 | Dannettell | 318/139 |
| 3,241,014 | 3/1966 | Gross | 318/139 |

FOREIGN PATENTS OR APPLICATIONS

| 220,383 | 3/1942 | Switzerland | 318/139 |

*Primary Examiner*—Bernard A. Gilheany
*Assistant Examiner*—W. E. Duncanson, Jr.
*Attorney*—Cushman, Darby & Cushman

[57] ABSTRACT

A control apparatus for vehicles and devices powered by stored electrical power such as golf cars, snowblowers and small tractors. The control apparatus includes a cam operated device operating in conjunction with the stored electrical power, said cam device including cam operated means movable between initial and terminal power regulating positions. In a first or initial regulating position, the cam device is adapted to connect first and second sources of electrical power in parallel, in a second power regulating position the cam is adapted to connect the same sources in parallel with a resistor cut into the circuit, in a third power regulating position, the cam is adapted to connect the sources in series and in a fourth position, it is adapted to connect the sources in series with a resistor cut into the circuit. A further feature includes the provision of a reverse mechanism providing first and second reverse speeds for a vehicle or device by connecting the sources in parallel with a resistor cut into the circuit to provide a first reverse speed, a second reverse speed being provided by connecting the sources in parallel without the resistor in the circuit. A still further feature is the provision of a braking feature which cuts the power being supplied to a motor for the system once the braking mechanism is actuated.

22 Claims, 3 Drawing Figures

PATENTED OCT 3 1972 3,696,279
FIG.1
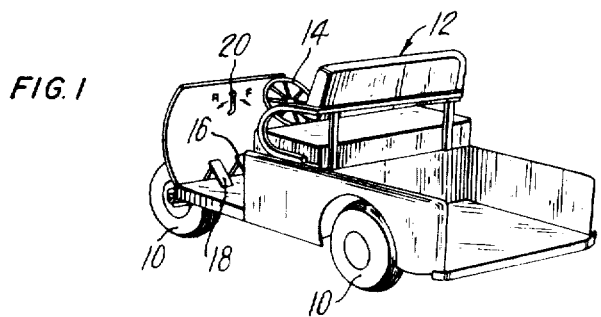
FIG.2
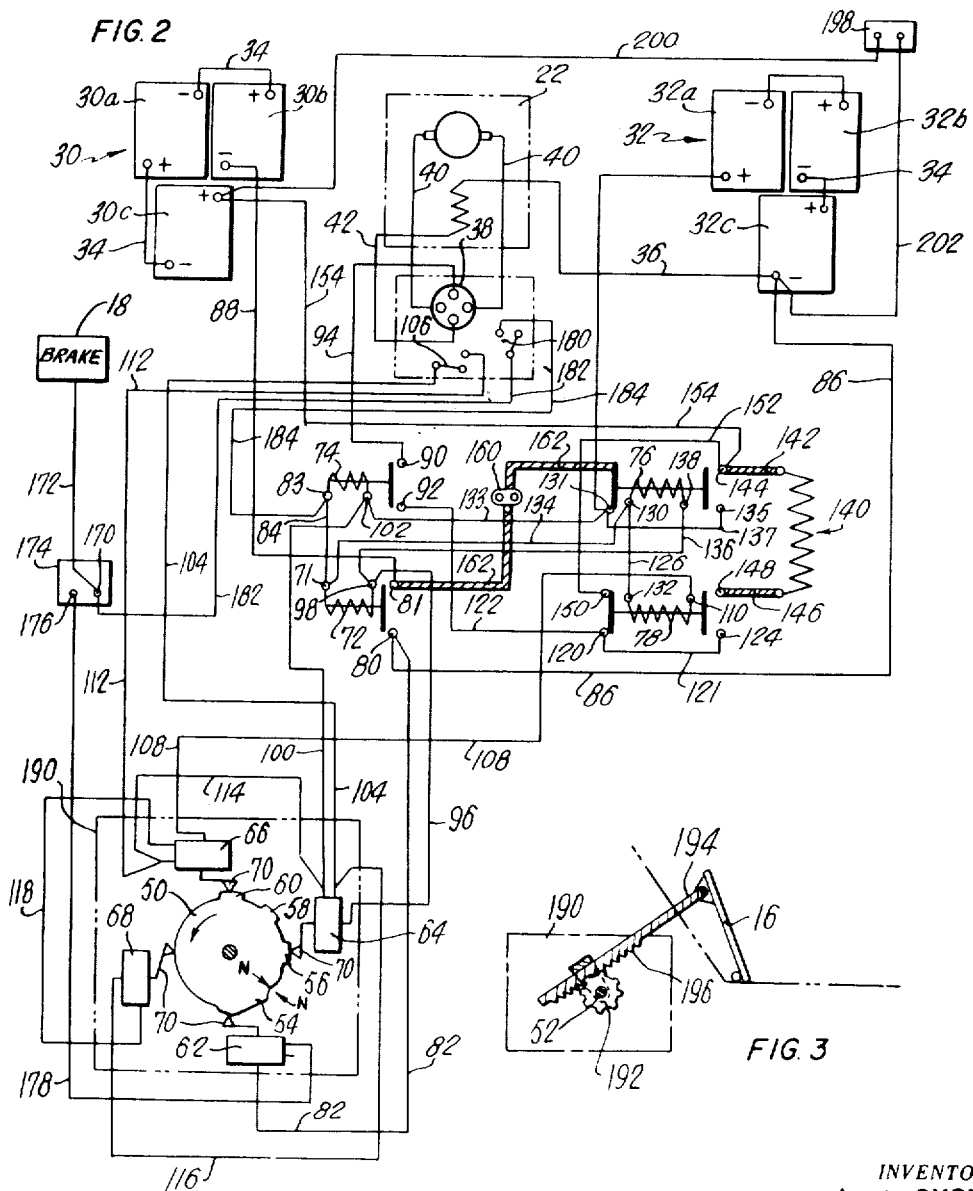
FIG.3
INVENTOR
Louis GYORI
Cushman Darby & Cushman
ATTORNEYS

ELECTRICAL CONTROL APPARATUS

This invention relates to control apparatus.

More particularly, this invention relates to a control apparatus for D.C. vehicles adapted to control the speed and operation of such D.C. driven vehicles such as golf cars, or other D.C. powered apparatus such as snowblowers, tractors, etc.

Today, there are a large number of different types of vehicles or devices driven or operated by stored electrical power using the D.C. propulsion system; conventionally, such vehicles or devices are powered with the use of storage batteries using the control means to govern the power capacity connected to an electric motor. A typical example of specific types of such systems is illustrated in U.S. Pat. Nos. 3,241,019, 3,264,540 and applicant's Canadian Pat. No. 824,791. In these control systems, a source of stored electrical power is employed using a control circuit which includes different types of means for providing various power levels to an electric motor, used to drive the vehicle.

Heretofore, one of the problems in the art has been the provision of a control system of a relatively inexpensive nature capable of standing up to heavy service requirements insofar as component life of the control circuit and battery life is concerned. In various types of vehicles, increased component life in the control circuit and increased battery life can be obtained using transistorized control circuits, which, however, increase substantially the cost of the system.

To lower the cost of the control system, it has been necessary to develop systems other than transistorized control systems for economic reasons. In this latter type of development, problems have arisen in that conventionally, the latter systems have employed vapor switches and heavy resistors to provide a variable speed control circuit having e.g. 3 to 5 power level settings. In using this type of arrangement, it is well known to those skilled in this art that such systems have several disadvantages in that due to the power capacity of the stored electrical power, considerable arcing occurs in the vapor switch when going from a lower power level to a higher power level, or vice versa, thereby decreasing considerably the life of the control switch for such apparatus. A still further problem is that in such prior art, the heavy resistors employed to provide the various speed levels necessarily build up a high degree of heat dissipation and moreover, results in a considerable power loss and drain from the capacity of the stored electrical power.

One solution to the above problems is that proposed in applicant's Canadian Pat. No. 824,791, wherein there is taught an improved control switch which inhibits to a substantial degree arcing in the vapor switch between the various points of contact representing different power capacities (and hence speed levels), which may be used in conjunction with an improved control circuit supplying various power capacities by employing a power source of e.g. two or more batteries, which are connected in series and parallel to provide the various power levels.

With this invention, applicant has developed an improved control apparatus which substantially eliminates all arcing in the control switch controlling the power supply to an electric motor, which control circuit is used in the control apparatus according to the present invention.

More particularly, in accordance with the present invention there is provided a control apparatus for electrically powered vehicles in which there is provided at least first and second sources of electrically stored power, electrically conductive means for connecting each of said sources in parallel and in series with each other, at least one resistor in electrically conductive relationship with electrically conductive means, and a cam operated control apparatus connected to the electrically conductive means, said cam operated means being movable through a fixed path of travel between initial and terminal power regulating positions including a first power engaging position adapted to connect said first and second electrically stored sources of power in parallel and connected in series and in effect "shunted" with said resistor, a second power engaging position adapted to connect said first and second sources of stored power in parallel without said resistor, a third power engaging position adapted to connect said first and second sources of electrically stored power in series and connected in series with said resistor and a fourth power engaging position adapted to connect said first and second sources of stored power in series without said resistor.

In accordance with a further aspect of the present invention, the above-described apparatus may include switch means adapted to provide a forward-reverse connection for the control circuit with an electric motor to determine the direction of rotation of the electric motor, and hence provide a vehicle with a forward and reverse direction of travel. In accordance with this modified form of the invention, the apparatus may therefore include a forward-reverse switch connected in operative relationship to an electric motor, operating in conjunction with the above-described cam apparatus wherein the cam apparatus includes a first reverse power engaging position adapted to connect said first and second sources of stored power in parallel and connected in series with said resistor, and a second power engaging reverse position wherein said first and second electrically stored sources of power are connected in parallel without said resistor.

In a still further modified form of the present invention, the control circuit may include switch means adapted to operate in conjunction with a vehicle braking system whereby when said braking system is actuated, said control apparatus is effective to prevent power from being supplied to the electric motor. To this end, in this preferred embodiment, the control circuit desirably includes switch means operating in conjunction with said cam operated control apparatus whereby when the braking system is actuated said cam operated control apparatus prevents said sources of stored electrical power from supplying power to the electric motor.

A preferred embodiment of the cam operated control means of the present invention, includes a rotatable cam rotatable about a fixed axis, the cam being operatively connected to a manually actuatable device, such as an accelerator pedal adapted to be operated by an operator's foot, or other suitable means such as a control lever adapted to function in the same manner as an accelerator pedal. To this end, the preferred rotatable cam apparatus operates in conjunction with a first switch adapted to connect said sources of stored electrical power in parallel, a second switch adapted to connect said sources of stored electrical power in series, and a third switch adapted to connect at least one resistor in operative relationship to said first and second sources of stored electrical power; in a preferred embodiment wherein the apparatus of the present invention includes a reverse mechanism, the cam operated apparatus also includes a fourth switch adapted to connect said first and second sources of stored electrical power in operative relationship, in conjunction with said third switch means whereby said cam is capable of providing first and second power capacities for a reverse direction to the electric motor. The above-described first, second, third and fourth switch means operating in conjunction with the cam apparatus may be any suitable type of switch well known to those skilled in the art capable of functioning in the manner described; typically, such switches are microswitches.

To operate in conjunction with the above-described switch means, the rotatable cam includes a plurality of spaced-apart switch engaging positions thereof whereby upon rotation of said cam, said cam is effective to engage one or more of the above-described switch means in a predetermined and desired sequence. To this end, the cam engaging positions may include projections extending about the periphery of the cam adapted to engage the respective cam followers connected to the switch means — e.g. microswitches whereupon the cam followers of the switch means being displaced from a predetermined position by the cam engaging positions, are effective to close or actuate the switch means thereby to provide the required and desired power capacity to an electric motor.

The electrically conductive means for connecting each source of electrically stored power in parallel and in series with each other, in conjunction with the cam apparatus of the present invention, may be any suitable conductive leads or wiring conventionally associated in this art with the circuitry involved in such apparatus, the capacities and nature of which will be readily understood. To this end, the circuit interconnecting the cam operated apparatus, the resistor and the sources of stored electrical power will likewise include conventional control solenoids if and as desired.

The first and second sources of stored electrical power may be any suitable sources capable of providing the desired capacity for the operation of the electric motor and hence vehicle; preferably each of the first and second sources are capable of providing substantially identical power capacities. Conventionally, the most common and readily available type of stored electrical power, for most applications within the present invention, are commercially available batteries whose capacities may vary from e.g. 6 to 12 volts each. However, as will be appreciated by those skilled in the art, other similar sources of stored electrical power may be employed as the power source for the present invention — e.g. dry electrical cells, etc.

The rating of the resistor employed in the control apparatus of the present invention will vary depending on several factors, including for example, the resistance encountered in the various conductive means described hereinbefore and the degree to which it is desired to reduce the voltage of the power sources.

The total power capacities of each source of stored electrical energy will vary depending on the type of vehicle system or apparatus in which the present invention is incorporated. Thus, for example, while systems such as golf cars will typically have a total power capacity of about 36 volts divided approximately equally between the first and second sources, other lighter or heavier vehicle systems (depending on their use) may require increased or decreased power capacities. Each power source may be made up of a plurality of individual sources having an aggregate total sufficient to provide the required capacity for each source; thus, for example, three or more batteries may be connected in series, each of e.g. 6 volts to provide a total of e.g. 18 volts for each source.

If desired, the control circuit of the present invention may include means for preventing accidental electrical overloading and thus prevent damage to the circuit and electric motor. To this end, there may be included one or more circuit breaking means as for example a fuse of sufficient capacity to accommodate operation of the circuit under normal conditions but capable of breaking the circuit at a desired level under abnormal conditions. In practice, desirably the circuit breaking means is connected between the source of electrical stored power and the electric motor within the circuit of the present invention.

The types of vehicles to which the present invention can be applied include, for example, golf vehicles and personnel or light industrial carriers such as indoor or outdoor vehicles adapted to carry personnel between, e.g. one building and another, mailman transportation carriers, food transportation carriers, etc. The present invention also has application to other devices such as, for example, snowblowers, small tractors, etc.

The present invention has many advantageous features over proposed prior art control systems including longer component life, better total distance on daily operation of such vehicles, a less likelihood of the power sources being discharged completely during daily operation which in turn results in longer life for the stored power sources. Still further, the present invention provides a control system which provides the same advantageous features and results as transistorized units at a far lower economical factor.

Having thus generally described the invention, reference will now be made to the accompanying drawing in which FIG. 1 is a schematic view of a typical vehicle adapted to utilize the control apparatus of the present invention;

FIG. 2 is a circuit diagram illustrating a preferred embodiment of the apparatus of the present invention; and FIG. 3 is an enlarged view showing the mounting of the cam device to the accelerator of the vehicle.

Referring initially to FIG. 1, there is illustrated a typical vehicle such as a golf car adapted to employ the apparatus of the present invention. Typically, these vehicles are mounted for movement by employing pneumatic tires 10 and have a body or passenger-carrying compartment indicated generally by reference numeral 12. The vehicle may conventionally include steering means such as a steering wheel 14 connected to one or more steering wheels by a suitable driving linkage, an accelerator pedal 16 and a brake pedal 18, together with forward-reverse lever 20 connected to switch means hereinafter described adapted to govern the direction of travel of the vehicle.

Such vehicles as those described above are driven with stored electrical power using a D.C. electric motor indicated generally by reference numeral 22, mounted at a suitable location within the vehicle. To this end, referring to FIG. 2, the control apparatus incorporating the present invention includes a pair of sources of stored electrical power comprising conventional battery banks 30 and 32, each bank being comprised of three separate batteries 30a, 30b, 30c and 32a, 32b, 32c, respectively (all e.g. of 6 volts each). The batteries of each battery bank 30 and 32 are connected in series by conductive leads 34 connecting the respective batteries, whereby each bank using the above voltage value, provides a total of 18 volts.

The electric motor 22 is connected to the battery bank 32 via conductive lead 36; and to a conventional forward-reverse switch 38 via conductive leads 40. The forward-reverse switch contains a further lead 42 supplying power to the motor from battery bank 30 through the control circuit and apparatus as hereinafter described in greater detail. Suitable means are provided for connecting the forward-reverse lever 20 to the forward-reverse switch 38, such means being conventional and well known to those skilled in the art.

In accordance with the present invention, the control apparatus includes a rotatable control cam indicated generally by reference numeral 50, mounted for rotation about shaft 52. The cam is provided with four spaced-apart contact positions indicated by reference numerals 54, 56, 58 and 60 in the form of projecting contact points extending outwardly from the cam 50. Operating in conjunction with cam 50 in the preferred embodiment shown are first microswitch means 62 being a "main" microswitch, second microswitch means 64 being a parallel microswitch means, third microswitch means 66 being a resistor microswitch means and fourth microswitch means 68 being a reverse microswitch means. Each of the microswitches 62, 64, 66 and 68 is provided with contact points or a cam follower 70 adapted to engage a contact on the cam 50 as hereinafter described in greater detail.

The main microswitch 62 is adapted to connect the power sources 30 and 32 in series to provide the combined total power capacity of the battery banks 30 and 32 to the electric motor 22; to this end, the circuit includes solenoids 72, 74, 76 and 78 with the main microswitch 62 being connected to power contact 80 of solenoid 72 via conductive lead 82. Power contact 71 of solenoid 72 connects solenoid 72 to power contact 83 of solenoid 74 via conductive lead 84. Power from the battery banks 30 and 32 is supplied to solenoid 72 via conductive leads 86 and 88 respectively, terminating at power contact point 80 and 81 of solenoid 72. In turn solenoid 74 includes additional contact points 90 and 92, contact point 90 being connected via conductive lead 94 to the forward-reverse switch 38, with conductive lead 42 as hereinabove described being connected to the electric motor 22.

The parallel microswitch 64 is connected via conductive lead 96 to power contact 98 of solenoid 72 and in addition, via conductive lead 100 to power contact 102 of solenoid 74. Additionally, parallel microswitch 64 includes conductive lead 104 in connection with a switch 106, switch 106 serving to provide a safety override between parallel microswitch 64 and a reverse microswitch 66.

Reverse microswitch 66 includes a first conductive lead 108 connected to power contact 110 of solenoid 78 and conductive lead 112 in contact with switch 106 described hereinabove. In accordance with this invention, reverse microswitch 66 is connected to parallel microswitch 64 by means of conductive lead 114.

As previously described, a further feature in an apparatus of the above type is the provision of a two-stage power level for the reverse drive of a vehicle, which is provided by employing the reverse microswitch 68 operatively connected to parallel microswitch 64 by means of conductive lead 116; and in addition by connecting reverse microswitch 68 with resistor microswitch 66 via conductive lead 118.

Power contact point 92 of solenoid 74 is operatively connected to power contact point 120 of solenoid 78 via conductive lead 122, the power contact point 120 of solenoid 78 being connected to power contact point 124 of the same solenoid via conductive lead 121. Likewise, solenoid 76 is connected to solenoid 78 via conductive lead 126 contacting power points 130 and 132 of the respective solenoids. In turn, solenoids 76 and 72 are interconnected via conductive lead 134 connected to power contact point 103 of solenoid 76 and power contact point 71 of solenoid 72. In addition, conductive lead 136 connects power contact point 138 of solenoid 76 to power contact point 98 of solenoid 72 and conductive lead 133 connects power contact point 131 of solenoid 76 with power contact point 101 of solenoid 74. Power contact point 131 is also connected to power contact point 135 of the same solenoid 76 via conductive lead 137.

In the embodiment shown, the control apparatus circuit includes a resistor indicated generally by reference numeral 140 connected via lead 142 to power contact point 144 of solenoid 76 and via lead 146 to power contact point 148 of solenoid 78. In turn, power contact point 144 of solenoid 76 is connected to power contact point 150 of solenoid 78 via conductive lead 152. Connected to conductive lead 142 of resistor 140 is a further conductive lead 154 connected to battery bank 30.

If desired, the circuit of the present invention may include means to prevent overloading of the circuit and possible subsequent damage thereto, such means being shown in the preferred embodiment as a fuse 160 connected between power contact point 81 of solenoid 72 and power contact 131 of solenoid 76 via conductive leads 162.

According to a further aspect, a control apparatus and circuit as above described may also include switch means adapted to operate in conjunction with the vehicle braking system whereby when the brake 18 of the vehicle is actuated, power to the electric motor is cut. To this end, the brake 18 may be connected to a power contact point 170 of a suitable switch 174 via a rigid shaft power contact point 170 of the switch being in operative relationship to a further power contact point 176 and when the brake 18 is actuated, the shaft 172 will cause the lever of the switch 174 to close the power contact point 176. The latter contact 176 is connected to the main microswitch 62 via conductive lead 178; the power contact point 170 being connected to a further switch indicated generally by reference numeral 180 by conductive lead 182. Switch 180, like switch 106, is a safety overriding switch operating between brake switch 174 and microswitch 62 so that when switch 174 is closed, switch 180 is connected to actuate the solenoid 74. Connected to switch 180 is a further conductive lead 184 connecting with power contact point 83 of solenoid 74.

Referring now to FIG. 3, the cam switch means is connected to, in the embodiment shown, an accelerator pedal 16 as herein described. To this end, the cam switch means is mounted in a suitable housing 190 and includes, as previously mentioned, shaft includes about which the cam 50 rotates. Shaft 52 includes a toothed gear wheel 192 mounted thereon with the accelerator 16 including a shaft 194 having teeth 196 thereon engaging the teeth of the gear wheel 192. Upon movement of the shaft 194 as, for example, with the foot of an operator of the vehicle, the shaft 194 will rotate the shaft 52 thereby rotating cam 50 with the contact points of the cam engaging the various cam followers of one or more microswitches, as explained hereinafter in greater detail. In this embodiment, most preferably the pedal 16 is spring-loaded to provide a return to an initial or starting position upon pressure being removed from the pedal.

If desired, the above type of system may include suitable means, such as a junction control 198, for the purposes of permitting the battery banks 30 and 32 to be recharged. To this end, an external power source may be connected to the junction control 198, which contains conductive leads 200 and 202 in contact with the respective battery banks.

In operation of a vehicle similar to that illustrated in FIG. 1, assuming it is desired to advance the vehicle in the forward direction, the lever 20 will be moved to the forward position thereby placing switch 38 in a position to permit power to be supplied to the electric motor 22 whereby the motor will rotate in a direction to advance the vehicle.

For forward operation or movement of the vehicle, the forward-reverse lever 20 is moved to the forward position, which in turn actuates forward-reverse switch 38 to the desired position. The accelerator pedal 16 is then depressed which moves the arm 194 with teeth 196 thereon thus rotating the gear 192 on shaft 52. Rotation of the shaft 52 a predetermined length thereby rotates the rotatable cam 50 to bring the contact points thereon into operative relationship with the cam followers 70 of the parallel microswitch 64 and the resistor microswitch 66, which then energizes the circuit as described hereinabove to bring resistor 140 into the circuit and to connect battery banks 30 and 32 in parallel, thereby supplying a first power potential to the electric motor 22. By way of specific example, where each battery bank 30 and 32 has a power capacity of 18 volts and, for example by employing a resistor rated at a predetermined ohm value (taking into consideration the given resistance for each particular circuit) the power supply or potential to the electric motor will be reduced to approximately 12 volts.

Further depression of the accelerator pedal 16, and hence rotation of the cam 50, will bring a contact point of the cam into operative relationship with only the parallel microswitch 64 whereby the resistor is cut out of the circuit and the power from each battery bank is joined in parallel and supplied to the electric motor. Using the above capacity figures of each battery bank 30 and 32, the circuit would then supply approximately 18 volts to the electric motor 22.

Upon further depression of the accelerator, rotation of the cam 50 will engage the cam follower 70 of microswitch 66 while cutting resistor 140 into the circuit and while joining the battery banks 30 and 32 in series. In actuality, the resistor 140 is effectively connected in series with the battery banks 30 and 32 and therefore serves as a type of shunting resistor. Accordingly, the resistor 140 is described in this specification and defined in the appended claims as "shunting" the sources of electrical power. Again, using the above figures for the power capacities of the banks 30 and 32, approximately 29 volts will be delivered to the electric motor 22.

Depression of the accelerator pedal to its fullest extent will rotate cam 50 so as to cut out of the circuit resistor 140 while joining battery banks 30 and 32 in series thereby providing the total capacity e.g. 36 volts to the electric motor 22. The speed of the vehicle will thus depend on the different amounts of power supplied to the electric motor 22 through the above-described arrangement, and which may therefore be varied by governing the movement of the accelerator.

In accordance with a further feature of this invention, for reverse movement of the vehicle, the forward-reverse lever 20 will be moved to the reverse position, which in turn regulates switch means 38. Thereafter, upon depression of the accelerator pedal a predetermined distance, thereby rotating cam 50 cam followers 70 of the reverse microswitch 68, the resistor microswitch 66, and the parallel microswitch 64 are actuated whereby resistor 140 is cut into the circuit while the battery banks 30 and 32 are connected in parallel. Using the above power capacities of the battery banks 30 and 32 this would provide a total of approximately 12 volts to the electric motor 22. Further depression of the accelerator 16 will result in cam 50 rotating so as to engage only the parallel microswitch 64 of the reverse microswitch 68 whereby the battery banks 30 and 32 are connected in parallel to supply a total of 18 volts to the electric motor 22. In this manner, a two-speed level is obtained for reverse movement of the vehicle.

In a modified form, where switch means 174 is provided operating in conjunction with the braking assembly for the vehicle, upon depression of the brake pedal 18 the switch means 174 will cut the power being supplied to the electric motor 22. In this manner, the motor 22 will not provide power for driving the vehicle during braking action.

As will be seen from the drawings and the above description, the present invention utilizes a rotatable cam in place of the conventional type of switching means normally employed in this art for this purpose. By using the structure of the present invention, the cam has the advantage that it will not go out of adjustment and no short circuits can develop, eliminating many of the maintenance problems associated with prior art devices.

From the above description, it will be understood by those skilled in the art that the control apparatus of the present invention may be modified to provide other embodiments within the scope of the present invention. Thus, for example, the present invention contemplates that the control device described above may be employed in vehicles or devices in which each source of stored electrical power, for example storage batteries, is comprised of two or more sets or banks of batteries. In a specific example with reference to the above-described drawings, each source of stored electrical power 30 and 32 may be comprised of two or more battery banks whereby the cam operated control means in the first and second power regulating positions will connect the two sources of stored power, each comprising two or more sets of battery banks in parallel with and without a resistor cut into the circuit; and similarly in the third and fourth power regulating positions will connect the two sources of stored electrical power each comprised of the same two or more sets of battery banks in series with and without the resistor cut into the circuit. In a typical arrangement of the above embodiment each set of batteries of the two or more sets of each source of electrical power may have a potential of e.g. 18 volts, whereby each source provides a potential of 36 volts, each in turn provides a total potential of 72 volts for both sources; such greater potentials may be employed where the control device of the present invention is incorporated into heavier vehicles or devices requiring larger sources of stored electrical power.

It will be understood that various modifications can be made to the above-described preferred embodiments without departing from the spirit and scope of the present invention.

I claim:

1. In a control apparatus adapted for use with first and second sources of stored electrical power, the improvement comprising cam operated control means adapted to provide a stepped series of power regulating positions, said cam operated means including a cam rotatable about a fixed axis through a fixed path of travel between initial and terminal power regulating positions including a first power regulating position adapted to connect said first and second sources of power in parallel and to be shunted with a resistor, a second power regulating position adapted to connect said first and second sources of stored power in parallel without said resistor, a third power regulating position adapted to connect said first and second sources of electrically stored power in series and shunted with said resistor and a fourth power regulating position adapted to connect said first and second sources of stored power in series without said resistor, a plurality of solenoid actuable members energizable in response to movement of said cam through said power regulating positions, and at least two of said plurality of solenoid actuable members being energized simultaneously during the period of time said cam is located in certain of said power regulating positions, and a plurality of power switching elements controllable by said plurality of solenoid actuable members to enable the aforesaid series and shunted connections of said sources of stored electrical power with respect to said resistor, said resistor being operatively connected across power switching contacts controllable by at least two of said solenoid actuable members and being controlled by last named solenoid actuable members for operative interconnection in said shunting positions.

2. A control apparatus, as defined in claim 1, adapted for use with electrically powered vehicles or devices comprising first and second sources of electrically stored power, electrically conductive means for connecting each of said sources in parallel and in series with each other, at least one resistor in electrically conductive relationship with said electrically conductive means, and a cam operated control means connected to the electrically conductive means, said cam operated means being movable through a fixed path of travel between initial and terminal power regulating positions including a first power regulating position adapted to connect said first and second electrically stored sources of power in parallel and shunted with said resistor, a second power regulating position adapted to connect said first and second sources of stored power in parallel without said resistor, a third power regulating position adapted to connect said first and second sources of electrically stored power in series and shunted with said resistor and a fourth power regulating position adapted to connect said first and second sources of stored power in series without said resistor, a plurality of solenoid actuable members operatively connected to said electrically conductive means and being energizable in response to movement of said cam through said power regulating positions, and at least two of said plurality of solenoid actuable members being energized simultaneously during the period of time said cam is located in certain of said power regulating positions, and a plurality of power switching elements controllable by said plurality of solenoid actuable members to enable the aforesaid series and shunted connections of said sources of stored electrical power with respect to said resistor, said resistor being operatively connected across power switching contacts controllable by at least two of said solenoid actuable members and being controlled by said last named solenoid actuable members for operative interconnection in said shunting positions.

3. The apparatus of claim 2, wherein said first and second sources of stored electrical power comprise first and second banks of batteries, each bank having substantially the same power potential.

4. The apparatus of claim 2, wherein said apparatus includes means for preventing current flow to an electric motor, said means being adapted to operate in conjunction with a braking means for a vehicle.

5. The apparatus of claim 2, wherein said cam operated control apparatus is mounted in operative relationship to manually operable means whereby operation of said manually operable means rotates said cam through said fixed path.

6. The apparatus of claim 2, wherein there is included means for preventing overloading of said electrically conductive means.

7. An electrically powered vehicle or device having the control apparatus of claim 2, said vehicle further including manually operable means adapted to move said cam between said initial and terminal power regulating positions, an electric motor for said vehicle or device, said control apparatus connecting said first and second sources of power to said electric motor through said electrically conductive means.

8. The vehicle of claim 7 further comprising brake means, said brake means being connected to switch means, said switch means being in operative relationship to said sources of power whereby when said brake means is actuated, said switch means is effective to prevent connection between said first and second sources of power and said electric motor.

9. The vehicle of claim 7, wherein said vehicle is a golf vehicle.

10. In the control apparatus as defined in claim 1 and adapted for use with a vehicle or like device which can be moved in forward and reverse directions, the improvement comprising the cam operated control means being adapted to provide a stepped reverse speed level, said cam operated control means being connected to said solenoid actuable members in such manner that when said cam is moved to one of said power regulating positions said first and second sources of stored electrical power are connected in parallel and shunted with said resistor to provide a first reverse speed level, and when said cam is moved to another of said power regulating positions said first and second sources of electrical power are connected in parallel without said resistor to provide a second reverse speed level.

11. In a control system for an electrically powered vehicle or device wherein said vehicle or device includes a source of stored electrical power adapted to provide a power potential to an electric motor for driving or operating said vehicle or device with said control system controlling said power potential to said electric motor, and wherein said vehicle or device includes brake means adapted to halt the movement or operation of said vehicle or device, the improvement wherein said control system includes brake switch means connected in operative relationship to said brake means and to said source of stored electrical power, safety switch means operatively connected to brake switch means and operating in conjunctive relationship therewith, first microswitch means operable by a cam and which first microswitch means is operatively connected to said brake switch means, and a solenoid actuable member and solenoid switch means operable thereby, said solenoid switch being operatively connected to said brake switch means and operable therewith, whereby when said brake means is actuated, said control system is effective to prevent said stored electrical power from providing a power potential to said electric motor.

12. A control system for use with electrically operable apparatus driven from a source of electrical power, said system comprising a cam rotatable about a fixed axis through a plurality of successive power regulating positions from an initial power regulating position to a terminal power regulating position, a resistive member operatively interconnectable between said source of electrical power and said electrically operable apparatus in certain of said power regulating positions to achieve selected stepped amounts of power to said electrically operable apparatus, a plurality of inductively actuable members, selected ones of said plurality of inductively actuable members being energizable in response to movement of said actuating member through said power regulating positions, and at least two of said plurality of inductively actuable members being energized simultaneously during the period of time said cam is located in certain of said power regulating positions, and a plurality of power switching elements controllable by said plurality of inductively actuable members to enable operative connection of said apparatus to said source of electrical power, to thereby provide a preselected controlled amount of increasing power at each of said successive power regulating positions, said resistive member being operatively connected across power switching contacts controllable by at least two of said inductively actuable members and being controlled by said last named inductively actuable members for operative interconnection between said source of stored electrical power and said electrically operable apparatus.

13. The control system of claim 12 further characterized in that said source of electrical power comprises a plurality of stored electrical power sources and said power switching elements enable operative connection between said electrically operable apparatus and said electrical power sources in a plurality of operative connection forms to provide said selected amounts of power at each of said power regulating positions.

14. The control system of claim 12 further characterized in that said inductively actuable members are solenoids.

15. The control of claim 12 further characterized in that said electrically operable apparatus is an electric motor drive for an electrically powered vehicle and said source of electric power comprises a plurality of storage batteries.

16. A control apparatus adapted for use with electrically powered vehicles or devices comprising first and second sources of electrically stored power, electrically conductive means for connecting each of said sources in parallel and in series with each other, at least one resistor in electrically conductive relationship with said electrically conductive means, a cam operated control means connected to the electrically conductive means and being adapted to provide a stepped series of power regulating positions, said cam operated control means comprising a cam rotatable about a fixed axis and said cam including a plurality of contact points thereon, said cam being movable through a fixed path of travel between initial and terminal power regulating positions including first, second, third and fourth power regulating positions, said electrically conductive means including first, second, third and fourth switch means, said first switch means being located at said first power regulating position and being located to be actuated by said cam to permit connection of said first and second sources of electrically stored power in parallel and shunted with said resistor, said second switch means being located at said second power regulating position and being located to be actuated by said cam to permit connection of said first and second sources of electrically stored power in parallel without said resistor, said third switch means being located at said third power regulating position and being located to be actuated by said cam to permit connection of said first and second sources of electrically stored power in series and shunted with said resistor, said fourth switch means being located at said fourth power regulating position and being located to be actuated by said cam to permit connection of said first and second sources of electrically stored power in series without said resistor, a plurality of solenoid actuable members operatively connected to selected ones of said first, second, third and fourth switch means and being energizable in response to movement of said cam through said power regulating positions and actuation of said switch means, said first and second switch means being operatively connected to selected ones of said plurality of solenoid actuable members in such manner that said first switch means is adapted to connect said first and second sources of electrical power in parallel, said second switch means is adapted to connect said sources of electrical power in series and said third switch means is adapted to shunt said resistor in operative relationship to said first and second sources of electrical power, and a plurality of power switching elements controllable by said plurality of solenoid actuable members to enable the aforesaid series and shunted connections of said sources of electrically stored power with respect to said resistor.

17. The apparatus of claim 16 wherein each of said first, second, third and fourth switch means includes cam follower means whereby rotation of the said rotatable cam actuates said cam follower means to actuate said switch means.

18. The apparatus of claim 16 wherein said fourth switch means is operatively connected to selected ones of said plurality of solenoid actuable members in such manner that said fourth switch means is adapted to connect said first and second sources of electrical power in parallel to provide a source of power for an electrical motor for a direction which is reverse to its normal direction of operation.

19. The apparatus of claim 18 wherein said fourth switch means is operatively connected to said third switch means whereby said third and fourth switch means operate in such manner to connect said first and second sources of power in parallel and shunted with said resistor.

20. The apparatus of claim 19 wherein there is included safety override switch means operatively interconnected between said third and fourth switch means.

21. The apparatus of claim 16 wherein said first, second, third and fourth switch means are microswitches.

22. A control apparatus adapted for use with electrically powered vehicles or devices comprising first and second sources of electrically stored power, electrically conductive means for connecting each of said sources in parallel and in series with each other, at least one resistor in electrically conductive relationship with said electrically conductive means, a cam operated control means connected to the electrically conductive means and being adapted to provide a stepped series of power regulating positions, said cam operated control means comprising a cam rotatable about a fixed axis and said cam including a plurality of contact points thereon, said cam being movable through a fixed path of travel between initial and terminal power regulating positions including first, second, third and fourth power regulating positions, said electrically conductive means including first, second, third and fourth switch means, said first switch means being located at said first power regulating position and being located to be actuated by said cam to permit connection of said first and second sources of electrically stored power in parallel and shunted with said resistor, said second switch means being located at said second power regulating position and being located to be actuated by said cam to permit connection of said first and second sources of electrically stored power in parallel without said resistor, said third switch means being located at said third power regulating position and being located to be actuated by said cam to permit said first and second sources of electrically stored power in series and shunted with said resistor, said fourth switch means being located at said fourth power regulating position and being located to be actuated by said cam to permit connection of said first and second sources of electrically stored power in series without said resistor, a plurality of solenoid actuable members operatively connected to selected ones of said first, second, third and fourth switch means and being energizable in response to movement of said cam through said power regulating positions and actuation of said switch means, and a plurality of power switching elements controllable by said plurality of solenoid actuable members to enable the aforesaid series and shunted connections of said sources of electrically stored power with respect to said resistor.

* * * * *